UNITED STATES PATENT OFFICE.

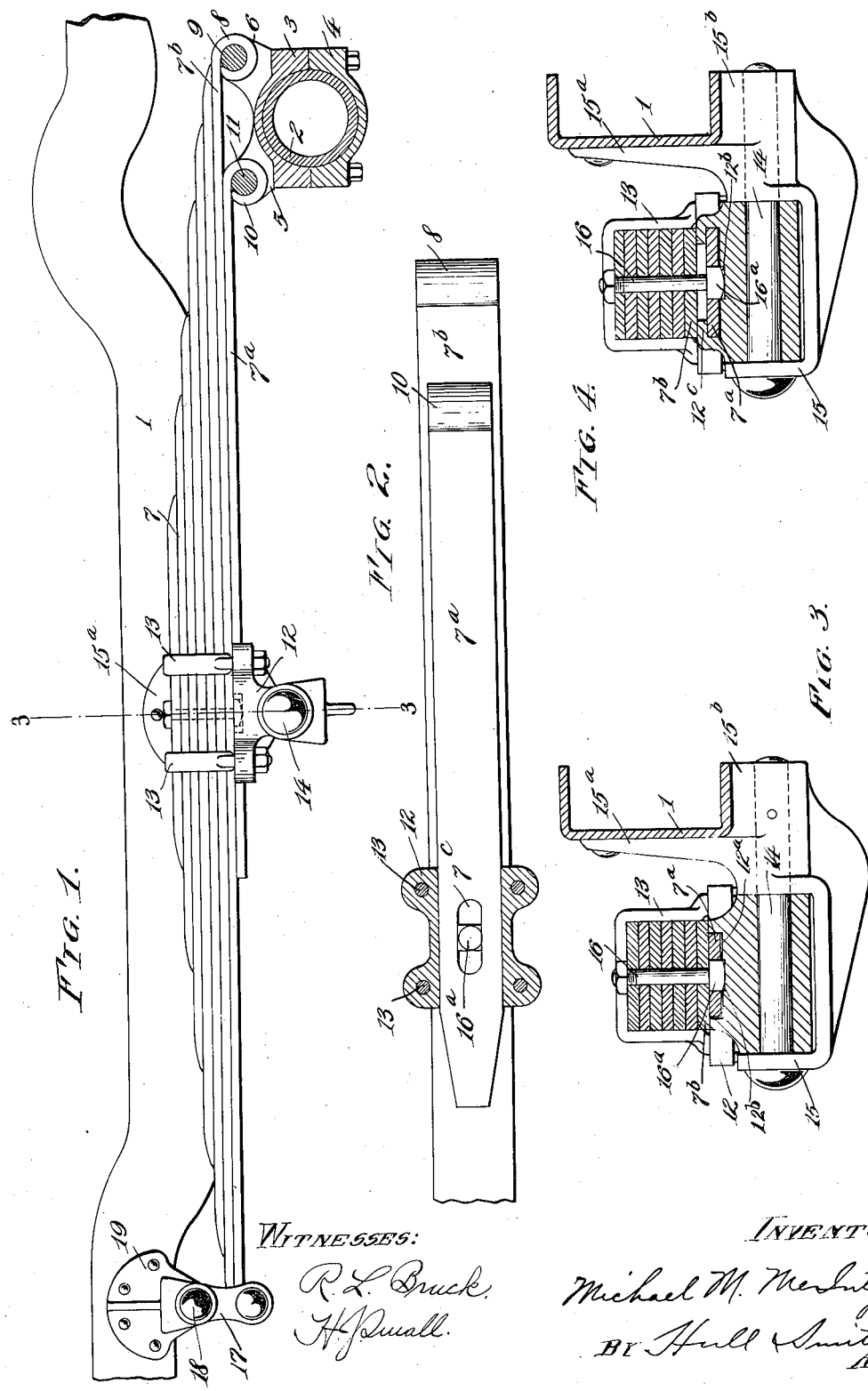

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,286,690.  Specification of Letters Patent.  Patented Dec. 3, 1918.

Application filed March 4, 1915. Serial No. 12,060.

*To all whom it may concern:*

Be it known that I, MICHAEL M. MCINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and more particularly to springs of the cantaliver type. In my patent, dated October 5, 1915, No. 1,155,752, I have disclosed a construction wherein a spring is connected to the axle at two points and by means of two leaves or plates and whereby provision is made for relative longitudinal movement between said leaves or plates. It is the general object of this invention to secure the same type of connection between the axle and the spring but in a different and, in some respects, an improved manner. With the foregoing general object in view, the invention may be defined further and even more generally as consisting of the combination of elements embodied in the claims hereto annexed and illustrated in the drawings accompanying and forming part hereof, wherein Figure 1 represents a side elevation of my spring and of the frame to which it is attached, the axle being shown in section; Fig. 2 is a bottom plan view of the right hand end of the spring shown in Fig. 1, showing the relation of the same to the spring seat, the spring seat being shown in section; Fig. 3 is an enlarged vertical section corresponding to the line 3—3 of Fig. 1; and Fig. 4 is a view, similar to Fig. 3, taken through a modified form of the invention.

Describing by reference characters the various parts illustrated herein, 1 denotes the side sill and 2 the axle of an automobile. 3 and 4 denote respectively the upper and lower member of a spring seat rotatably mounted upon the axle. The upper member is provided with two pairs of lugs 5 and 6 projecting upwardly therefrom and spaced apart longitudinally (that is, in the direction of the length of the spring). Assuming that the axle 2 is the rear axle of the vehicle, the lugs 5 project forwardly and the lugs 6 rearwardly.

7 denotes the spring generally and $7^a$ the bottom plate and $7^b$ the main plate of such spring. The main plate $7^b$ is provided with an eye 8 whereby it is connected to a pin 9 extending through the lugs 6. The plate $7^a$ is narrower than the plate $7^b$ and is provided at its rear end with an eye 10 whereby it is connected to a pin 11 extending through and connecting the lugs 5. The plate $7^a$ is considerably shorter than the main plate and, in fact, is shown as extending forwardly from the pin 11 a short distance beyond the center of the spring.

As is customary, the central portion of the cantaliver spring 7 is connected to a spring seat 12 by means of clips 13, and this spring seat is pivoted upon a bolt 14 carried by a U-shaped bracket 15 which is secured to the side sill 1 through arms $15^a$ and $15^b$. The spring seat 12 is provided with a recess $12^a$ therein which is of a width to receive freely the plate $7^a$, and the central portion of this recess is itself recessed, as indicated at $12^b$, for the reception of a head $16^a$ of the center bolt 16, the plate $7^a$ being provided with an elongated slot $7^c$ for said bolt. The combined depths of the slot $7^c$ and the recess $12^b$ is such as to bring the upper surface of the bolt head $16^a$ beneath the plate $7^b$ and out of frictional engagement therewith.

The front end of the spring (assuming that the spring is a rear spring) is connected to a pair of shackle links 17 depending from and pivotally supported by a bolt 18 carried by a bracket 19 attached to the sill 1.

With the construction as illustrated and described hereinbefore, a driving connection between the axle and the spring and between the spring and the frame is secured by the engagement of the plates $7^a$ and $7^b$ with their respective pins 11 and 9 and the engagement of the spring with the bracket 15. It will be observed that, by this mode of connecting the spring to the axle, the plates above the main plate $7^b$ may be extended to their proper reinforcing positions without any interference or hindrance due to the manner of connecting the spring with the axle.

The sliding connection between the plate $7^a$ and the spring seat and bolt head $16^a$ compensates for the relative longitudinal movement or slipping between the leaves $7^a$ and $7^b$ as the spring is deflected downwardly and upwardly.

In Fig. 4 there is shown a modification of the sliding connection between the plate 7ª and the spring seat and bolt head 16ª which differs from that illustrated and described in connection with Figs. 1 to 3 in that the plate 7ᵇ, instead of being nearly in engagement with the plate 7ª, rests upon a ledge or shelf which is provided on the spring seat by means of inwardly projecting flanges 12ᶜ which overhang the plate 7ª and form a support for the outer portions of the plate 7ᵇ and for the plates thereabove. The plate 7ª in this modification is shown as of substantially the same width as the main plate 7ᵇ and the auxiliary plates thereabove.

Having thus described my invention, what I claim is:—

1. The combination, with a vehicle body frame and axle, of a spring comprising a main plate and a plate therebeneath, a spring seat rotatably mounted on the axle, longitudinally spaced means for connecting said plates to the spring seat, a spring seat on the frame, means for rigidly connecting all but the second mentioned plate to the last mentioned spring seat, and a slidable connection between such second mentioned plate and the spring seat.

2. The combination, with a vehicle body frame and axle, of a spring comprising a plurality of plates, means for connecting one end of said spring to the axle, a spring seat carried by the frame, means for rigidly connecting all but one of said plates to the spring seat, and a slidable connection between the said one of said plates and the spring seat.

3. The combination, with a vehicle frame and axle, of a spring seat rotatably mounted on the axle, a spring comprising a main plate, a plate therebeneath, and one or more plates above the main plate, means for connecting the ends of the two first mentioned plates to longitudinally spaced portions of the spring seat, a spring seat on the frame, means for clamping the main plate and the plates thereabove to the last-mentioned seat, and a slidable connection between the second mentioned plate and the last mentioned seat and the main plate.

4. The combination, with a vehicle frame and axle, of a spring comprising a main plate, a plate therebeneath, and one or more plates above the main plate, means for connecting the ends of the two first mentioned plates to the axle, a spring seat on the frame, means for clamping the main plate and the plates thereabove to said seat, and a slidable connection between the second mentioned plate and the seat and the main plate.

5. The combination, with a vehicle frame and axle, of a spring seat rotatably mounted on the axle, a spring comprising a main plate, a plate therebeneath, and one or more plates thereabove, longitudinally spaced connections between the first two plates and the spring seat, a spring seat on the frame and having therein a recess wherein the plate beneath the main plate may reciprocate, and means for connecting the main plate and the plates thereabove to the last mentioned seat, the main plate being out of frictional engagement with the plate therebeneath.

6. The combination, with a vehicle body frame and axle, of a spring comprising a main plate, a plate on one side of such main plate and one or more plates on the opposite side of the main plate, means for connecting the ends of the first two plates to the axle, a spring seat carried by the frame, a slidable connection between the second mentioned plate and the spring seat, and means for clamping to said seat the main plate and the other plate or plates additional thereto and located on the opposite side of the main plate from the second mentioned plate.

7. The combination, with a vehicle frame and axle of a spring seat rotatably mounted on the axle, a spring comprising a main plate, a plate therebeneath, and one or more plates thereabove, longitudinally spaced connections between the first two plates and the spring seat on the frame and having a recess in its upper surface of a depth to receive therewithin the second mentioned plate, clips connecting the main plate and the plates thereabove to the last mentioned spring seat, and a bolt extending through said plates and having a head within an elongated slot in said second mentioned plate.

8. The combination, with a vehicle frame and axle, of a spring seat rotatably mounted on the axle, a spring comprising a main plate, a plate of less width than the main plate and located therebelow, and a plurality of plates above the main plate, longitudinally spaced connections between the first two plates and the spring seat, a spring seat on the frame and having in the upper face thereof a recess of sufficient width and depth to allow the lowest plate to slide therewithin and having a support above such lowest plate for the main plate, and means for securing the main plate and the plates thereabove to the last-mentioned spring seat.

9. The combination, with a vehicle frame and axle, of a spring seat rotatably mounted on the axle, a spring comprising a main plate, a plate of less width than the main plate and located therebelow, and a plurality of plates above the main plate, longitudinally spaced connections between the first two plates and the spring seat, a spring seat on the frame and having in the upper face thereof a recess of sufficient width and depth to allow the lowest plate to slide therewithin and having a support above such lowest plate for the main plate, means for securing the main plate and the plates thereabove to the last-mentioned spring seat, and a bolt extending through the leaves of the spring above the last mentioned seat and having its head within an elongated slot in the lowest plate.

10. The combination with a vehicle frame and axle, of a spring seat rotatably mounted on the axle, a spring comprising a main plate, a plate located therebelow, and a plurality of plates above the main plate, longitudinally spaced connections between the spring seat and the first two plates, a spring seat on the frame and having in its upper surface a recess with flanges overhanging the same and providing a guide for the second mentioned plate and a seat above such guide for the bottom of the main plate and means for securing the main plate and the plate thereabove to the last mentioned spring seat.

11. The combination, with a vehicle frame and axle, of a spring seat rotatably mounted on the axle, a spring comprising a main plate, a plate located therebelow, and a plurality of plates above the main plate, longitudinally spaced connections between the spring seat and the first two plates, a spring seat on the frame and having in its upper surface a recess with flanges overhanging the same and providing a guide for the second mentioned plate and a seat above such guide for the bottom of the main plate, means for securing the main plate and the plates thereabove to the last mentioned spring seat, and a bolt extending through the main plate and the plates thereabove and having its head located within an elongated slot in the said second-mentioned plate.

12. The combination, with a vehicle body frame and axle, of a spring comprising a main plate, a plate on one side of such main plate and one or more plates on the opposite side of the main plate, longitudinally spaced means for connecting the two first mentioned plates to the axle, a spring seat carried by the frame, a slidable connection between the second mentioned plate and the spring seat, and means for clamping to said seat the main plate and the other plate or plates additional thereto and located on the opposite side of the main plate from the second mentioned plate.

In testimony whereof, I hereunto affix my signature in the presence of two witnesses.

MICHAEL M. McINTYRE.

Witnesses:
CHRISTIAN GIRL,
J. B. HULL.